Patented Sept. 28, 1954

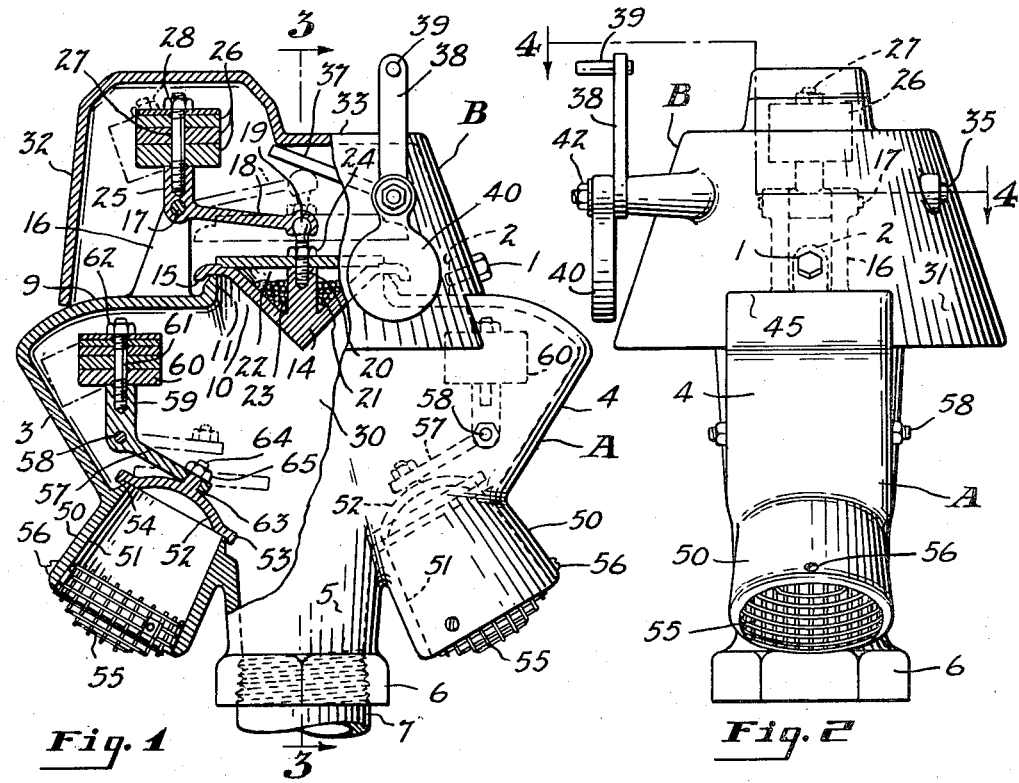

2,690,191

UNITED STATES PATENT OFFICE 2,690,191

VENT VALVE

Alfred J. Mosley, Cleveland, Ohio

Application January 17, 1949, Serial No. 71,279

10 Claims. (Cl. 137—527.8)

This invention relates to vent valves for controlling the flow of gaseous fluids. More particularly, the invention is concerned with improvements in vent valves of the type that are used tanks in which volatile fluids are stored.

Tanks for the storage of liquids such as gasoline, naphtha, and other volatile liquids are frequently of large size and so designed as to require that the pressure of gas in the space above the top of the liquid in the storage tank be substantially equalized with the pressure of the atmosphere surrounding the tank. It is not feasible economically to build storage tanks of sufficient strength to withstand large magnitude pressure fluctuations either positive or negative.

Customarily such storage tanks are equipped with valves for venting during filling and automatically to relieve excess pressure, such as occurs by thermal expansion when liquid stored in the tank or gas over the surface of such liquid becomes heated by the surrounding atmosphere or by the effect of the sun shining on the tank. Valves are also provided to permit the entrance of air into the tank when the pressure therein falls below that of the surrounding atmosphere, as occurs during emptying or draining, or by reason of thermal contraction when the storage tank is subjected to a sudden rainstorm or hailstorm.

It is essential that a vent valve employed on a storage tank for pressure equalizing purposes such as mentioned above be capable of rapidly releasing or admitting relatively large quantities of gas. Pressure equalization by gas flow preferably occurs simultaneously with pressure variations above and below predetermined differentials or limits which, in the case of rapid temperature changes, may occur quite rapidly in relatively short time periods. On the other hand, it is desired to avoid excessive free flow of atmospheric air into and out of storage tanks in order to reduce evaporative loss of stored liquid.

It is, therefore, one of the principal objects of the present invention to provide a generally improved vent valve of the character mentioned which, although being sensitive to gaseous pressure differentials of low magnitude, is arranged to operate, preferably by gravity, over predetermined ranges to reduce free gas flow and evaporative loss of stored volatile liquid in a tank controlled by the valve.

Another object is to provide such a valve having movable valve bodies in combination with improved mounting means for such valve bodies, so arranged as to provide rapid opening and closing of valve ports. As a preferential arrangement the invention provides poppet type valve bodies so mounted by means of suitable force providing devices such as springs or counterweights that the force providing means have minimum valve opening effect when the valve bodies are in or adjacent closed positions and have progressively increasing valve opening effect during movement of the valve bodies to open positions. More specifically, the present invention contemplates the mounting of valve bodies on the ends of pivoted levers having connection with weights supported eccentrically and in conditions of instability to turn about the pivot axes of the levers.

A further object of the invention is to provide a hollow casing vent valve formed with a plurality of openings and means for mounting the casing on a supporting conduit, one of the openings serving as an exhaust outlet so positioned as to provide for direct path or straight line flow of gas entering the casing under pressure from a supporting conduit. As a refinement of this aspect of the invention, the casing is also formed with symmetrically arranged inlet openings and, disposed within the casing for sealing the inlet openings, symmetrically arranged valve bodies and mounting means.

Another object of the invention is to provide a vent valve particularly adapted for use on a volatile liquid storage tank and having rapid opening and closing movements to restrict the ingress and egress of gases to predetermined pressure limits. Such valve, while being arranged to release gas from within the tank upon an increase in internal pressure above a predetermined differential pressure, and to admit atmospheric air into the tank upon a relative predetermined drop in pressure within the tank, is also arranged to minimize "breathing" or trivial flow of gas upon the occurrence of only small pressure differentials.

Other objects and advantages relate to certain details of construction and combinations and arrangements of parts which are set forth in the ensuing detailed description of a preferred embodiment of the invention. This description is made in connection with the accompanyng drawings forming a part of the specification. Like parts throughout the several views are indicated by the same letters and numerals of reference.

In the drawings:

Figure 1 is a front elevational view of a vent valve, partly in section and with parts broken away and removed such as is suitable for use on gasoline storage tanks;

Fig. 2 is a side elevational view of the valve;

Fig. 3 is a vertical sectional view with parts removed, taken substantially along the line indicated at 3—3 of Fig. 1; and Fig. 4 is a top or plan view of the valve, partly in section and with parts broken away and removed.

The valve comprises casing A, preferably a one-piece integral unit formed as by casting, and a cast metal hood B which surmounts the casing A and is secured to the latter by a cap screw 1 threaded into an upstanding ear 2 formed on the casing. The casing is of generally T shape in elevation, having wing portions 3 and 4 and a tapered tubular stem 5. The lower end of the stem is in the form of an internally threaded hex shaped base 6 by means of which the valve may be screwed onto a pipe 7 which is connected to an outlet opening in the top of the storage tank (not shown) with which the valve is to be used. The pipe communicates with gas space over the liquid stored in such tank.

Top 9 of the casing A is formed with a circular gas release opening 10. This opening is disposed in a horizontal plane, or substantially so, and is defined by an upstanding circular flange 11 that may be integrally formed on the casing A. The circular upper edge of the flange 11 is ground or otherwise finished true and even to form a seat which is sealingly engaged by circular rim flange of a cast metal conical valve body 14. A downturned circular lip 15 formed on the flange of the valve body surrounds the upper or valve seat edge of the casing flange 11 to locate the valve body on the valve seat and to prevent contamination of the valve seat by dirt particles and the like which might be blown or washed under the hood B.

At one side of the exhaust opening 10, upstanding pedestals 16 are mounted on or integrally cast with the top 9 of the casing and carry a horizontal pivot or shaft 17. A bell crank lever is supported for free turning on the shaft 17 between the spaced upstanding pedestals 16. One arm 18 of the bell crank lever normally extends generally horizontally from the pivot shaft 17 over the outlet opening 10 and is formed at its outer end with a spherical socket which receives spherical head 19 of a screw 20 threaded into a central post portion 21 of the valve body 14. A circular disc or cap covers the top of the valve body, the latter being hollowed out to provide a chamber 22, into which a predetermined quantity of comminuted weight material such as lead shot 23 is placed. The periphery of the cover disc is formed with a circular rabbet providing a shoulder which is received within a matching rabbet on the valve body 14 to center the disc with respect to the valve body. The screw 20 extends through a central aperture in the cap disc to hold the latter in place, the screw being secured in adjusted position by a locking nut 24 which bears against the disc.

The valve body 14 is guided by the lever on the pivot shaft 17 to travel in an arcuate path as it moves to and from the valve seat. It is proposed, by the present invention, to provide an augmenting force to aid the gas pressure force exerted on the underside of the valve body for the purpose of overcoming the weight of the valve in lifting the latter off the valve seat Although the weight of the valve body (and associated parts) tending to move the valve body to closed position by gravity is substantially constant, the augmenting force, provided by weights or springs, progressively increases during the opening movement of the valve body and progressively decreases during the closing movement thereof. Such an arrangement, while relying primarily upon the valve body weight to hold the valve closed and to determine the pressure differential at which unseating of the valve body is initiated, provides for rapid opening and closing movements since, after such movements are initiated, the variable valve opening force applied to the valve body is at a minimum when the valve body is seated.

In the preferential arrangement illustrated, the force augmentation for applying a lifting force to the valve body is supplied by a weight or weights carried by the pivoted bell crank lever. The bell crank lever is positioned so that the weight, normally supported in a dead center position over the pivot, imparts a turning movement to the assembly carried by the pivot shaft 17 when the valve body 14 is raised off its valve seat as by gas pressure within the chamber 30. Such turning movement progressively increases during opening of the valve (raising of the valve body) and progressively decreases during closing of the valve (lowering of the valve body).

Arm 25 of the bell crank lever extends vertically upward from the pivot shaft 17 when the valve parts are in their normal positions sealing the exhaust opening 10. A wieght 26 comprising stacked circular metal discs are supported on the upper end of the arm 25 as by stud 27. This stud is threaded into the end of the bell crank lever arm and extends through central apertures in the disc weights. Nut 28 threaded on the upper end of the stud 27 clamps the disc weights together against the end of the arm and retains them on the stud.

In the normal or closed position of the valve body 14, illustrated by the full lines of the figures, the outlet opening 10 is closed by the engagement between the valve body flange and the valve seat edge of the casing flange 11. In such position a substantially gas-tight seal is maintained by the weight of the valve body 14. The weight 26, being centered above the pivot 17 by the upstanding arm of the bell crank lever, does not exert a turning moment on the bell crank lever and does not tend to raise the closed valve body. Thus, by increasing or decreasing the weight of the valve body 14, adding or removing the comminuted weight material 23 as necessary, it is possible readily to adjust the device to vary the critical pressure differential between internal chamber 30 and the surrounding atmosphere at which the valve body 14 is raised off its seat to vent gas to the atmosphere.

As gas pressure within the casing chamber 30 approaches venting pressure, the valve body 14 raises to a "leakage position" only slightly off the valve seat, permitting a limited escape of gas. The resulting flow of escaping gas has the effect of reducing the pressure acting on the underside of the valve body and, if the pressure differential remains of small magnitude, has the effect of restricting the assembly against movement of the valve body at once to full open position. Should, however, the pressure within the casing chamber 30 increase above a predetermined differential with respect to the surrounding atmosphere, the valve body continues its upward movement beyond the minimum leakage clearance position, such upward movement of the valve body acting through the bell crank lever (which turns on the pivot shaft 17), to displace the weight 26 from dead center location on the pivot shaft. The displaced weight, being eccentrically mounted with respect to the pivot shaft, acts to impart a turning moment to the bell crank lever which, acting through the arm 18, exerts a lifting force on the valve body. As the valve body 14 continues upward movement against gravity under the force of the gas pressure within the casing chamber 30 aided by the lifting force exerted by the weight 26, the moment of the weight about the pivot 17 progressively increases to a maximum at the limit of movement of the valve body in full open position indicated by the broken lines of Fig. 1. The upward or opening movement of the valve body is limited by engagement of the arm 18 against the snuffer lever, later described.

While gas is thus vented through the opening 10, relieving the pressure in the casing chamber 30 and in the storage tank to which the valve is attached, the weight 26 continues to exert maximum moment (counterclockwise as viewed in Fig. 1) on the bell crank lever and maximum lifting force on the valve body 14 to hold the latter in full open position. The pressure within the casing chamber 30, thus reduced by the venting of gas to the atmosphere, approaches the differential at which the valve is to close. As determined by the weight of the valve body 14 opposed by the gravity force on the particular weight 26 that is employed and the progressively reduced force exerted against the underside of the valve body by the gas pressure, the valve body commences to move downwardly by gravity into sealing relation with the valve seat flange 11. This downward movement of the valve body, accompanied by a clockwise movement of the bell crank lever arms 18 and 25, as viewed in Fig. 1, moves the weight 26 toward normal position above the pivot shaft 17. The movement of the weight to the normal position progressively reduces its moment arm about the pivot shaft 17, thereby reducing the force or turning moment of the weight acting to lift or hold the valve body 14 off the valve seat. Closing movement, thus initiated against a progressively reducing gas pressure, proceeds positively and rapidly with an acceleration that results in a snaplike seating of the valve body. The tapered or conical bottom face of the valve body 14, by engagement with the circular flange 11, acts to guide the valve body into correct position with respect to the exhaust opening 10 during the closing of the valve.

By reason of the progressively increasing effect of the weight 26 during opening of the valve, a rapid and positive or snap opening action results. The rapid and positive snap closing action mentioned above is obtained by reason of the progressively decreasing effect or moment of the weight 26 as it moves from the displaced to the normal position illustrated by the broken and full lines, respectively, of Fig. 1.

The hood B is formed with a top 33 and integral frusto-conical side walls 31 that are concentrically disposed about the gas release opening 10 in the top of the T-shaped casing A. At one side, over the wing 3, the hood is formed with an extension 32 which incloses the pedestals 16 and the counterbalance weight 26. The bottom of the hood is open, providing passages 34 for the release of gas vented into the hood through the exhaust opening 10. Desirably, the frusto-conical walls 31 of the hood extend downwardly below the level of the casing top 9, the hood walls being relieved or cut away as indicated at 45 (Fig. 2) to receive the casing wings 3 and 4.

Extending across the inside of the hood opposite the extension 32 is a shaft or rod 35 journaled in aligned bosses 36 cast integrally with the hood. An arm 37 secured on the shaft 35 interiorly of the hood extends over the valve body 14 and is engageable with the bell crank lever arm 18 to force the latter and the valve body 14 downwardly to seal the exhaust opening 10 upon turning of the shaft 35 in a counterclockwise direction, as viewed in Fig. 1. Externally of the hood B an arm 38 is secured on the shaft 35 and extends upwardly from the latter. This arm can be manually actuated, either directly or by a cord or rope attached to a pin 39 on the end of the arm to force the valve body 14 into sealing position across the vent aperture 10 for the purpose of snuffing out a flame should escaping or vented gases become ignited. A counterweight 40 is also secured on the shaft 35, preferably on the external end thereof, and acts normally to retain the arm 37 in the raised position shown in Fig. 1, the arm thus serving as a stop to limit the upward or opening movement of the valve body. As illustrated in Fig. 4, the lever 38 and counterweight 40 may be formed with square or non-circular apertures received on a projecting mating or square end 41 of the shaft 35. A washer and nut 42 on the reduced diameter end of the shaft retains the arm and counterweight in position. Axial movement of the shaft 35 is restricted by a washer 43 received on the shaft inside the hood and a pin 44 which locates the washer on the shaft.

Under each of the casing wings 3 and 4 is a tapering tubular extension 50 which may be integral with the cast metal of the casing. These extensions provide tapered passages 51 of substantially circular cross section, each passage having a length at least substantially equivalent to its maximum diameter. The axes or center lines of the passages 51 are oblique to the central axis of the casing A which latter axis extends centrally through the stem 5 and the exhaust aperture 10. The passages 51 serve as inlet apertures to admit atmospheric air into the casing chamber 30 under the control of inlet valve bodies 52. These valve bodies are in the form of circular dished caps having radial flanges 53 finished on their underside to provide smooth circular faces engageable with the finished edges of circular ring flange extensions 54 projecting into the wing portions of the casing chamber 30.

The valve caps 50 thus seal the inner or small diameter ends of the passages 51, the large diameter or outer ends of the passages being fitted with cup shaped screens 55 which serve as fire stops and prevent objectionable entry of dirt into the valve casing. The screens are held in place by nuts and bolts 56 which extend through the walls of the tubular extensions 50.

The valve bodies or caps 52 are carried on the outer ends of arms 57 of bell crank levers pivoted on shafts 58. The bell crank levers carrying the valve caps 52 are similar to the bell crank lever previously described in connection with the exhaust valve body 14. The lever arms 57 are apertured at their outer ends to receive with loose fits threaded stud posts 64 secured centrally to the tops of the valve caps 52. Spacing washers 63 on the studs between the arms and the valve caps and retaining nuts 65 permit adjustment of the bell crank positions by using additional or different thickness washers. Extending vertically from the pivot shafts 58 when the bell crank levers are in normal position with the valve caps seated against the flanges 54, are arms 59, corresponding to the previously described bell crank arm 25, carrying weights 60 on studs 61. Retaining nuts 62 correspond to the nut 28 previously mentioned.

The position of each of the extensions 50 is such that it sheds rain, dirt, and dust, preventing objectionable entrance of water and dirt into the valve and tank. Inside the valve casing the upwardly projecting flanges 54 deflect condensate formed on the inside walls of the casing so that such condensate flows around the air inlet apertures and into the passage within the stem 5, thus returning such condensate to the tank to which the valve is connected.

Upon a decrease in the gas pressure within a tank to which the present valve is connected, as when liquid is being withdrawn from the tank, or when the tank is subjected to a relatively sudden chilling or cooling action, the resulting decrease in pressure within the valve chamber 30 relative to the pressure of the surrounding atmosphere causes the valve bodies or caps 52 to be raised off their seats for the flow of atmospheric air into the valve chamber 30 and thence into the tank to which the valve is connected. Lifting pressure applied to the underside of the valve caps 52 by the atmosphere to initiate the valve opening movement is augmented by the turning moments applied to the bell crank levers by the weights 60. Each of these turning moments, progressively increases as the corresponding valve body or cap 52 moves toward full open position indicated by the broken lines of Fig. 1. The opening movement is limited as by engagement of the weight 60 against the end wall of the casing wing.

In open position each of the valve caps 52 is so located and supported by the arm 57 of the corresponding bell crank lever as to deflect the inflowing atmospheric air entering the valve chamber 30 through the tubular passages 51 to flow toward and downwardly into the tapered throat within the tubular stem portion 5 of the casing.

In the construction of vent valves for use on storage tanks, recognition has previously been given to the advantages of Venturi-like shapes. Valves have been proposed employing tapered passages, such valves requiring relatively complicated arrangements difficult to assemble and expensive to make. The construction of the present valve provides tapered and Venturi-like passages in a simple structure which is inexpensive to manufacture and to assemble and service. The passage within the casing stem 5 is of substantial circular cross section and tapers inwardly, enlarging toward the chamber 30. The taper is of the order of about 2° to 8°, preferably about 5°.

The cross sectional area of the discharge opening 10 in the top of the casing is substantially equal to the corresponding projection of the tapered passage in the stem 5. Thus, in effect, the present valve provides a tapered through passage for gas exhausting from a tank to which the valve is connected. Such passage is substantially unobstructed, providing for straight line rectilinear flow. Gas exhausting through the opening 10 is deflected by the conical lower face of the valve body 14 to flow uniformly about substantially the entire circumference of the valve body and laterally out the discharge passages 34 in the hood B.

Each of the inlet passages 51 within the tubular extensions 50, being relatively long and of tapered circular section, provides for more efficient flow of air into the valve (and the tank to which the valve is attached) upon a relative drop in pressure within the valve and tank below that for which the valve is adjusted. The valve caps 52 are each normally held by gravity in sealing relation against the valve seats of the circular flanges 54. Upon such a drop or decrease in pressure, atmospheric air pressure raises the valve caps 52, or one of them, slightly off its valve seat. This initial opening of the valve cap permits air to flow into the casing chamber at a relatively low rate. The velocity of such flowing air, moving between the valve cap and its seat, has the effect of reducing the pressure under the cap so that the valve does not immediately swing to full open position. Should the pressure differential between the casing chamber 30 and the surrounding atmosphere continue to increase, however, the weight of the valve cap is overcome by atmospheric pressure and the valve cap swings to full open position, as indicated by the broken lines of Fig. 1. During this opening movement of the air inlet valve, the movement of the bell crank lever 59 away from "dead center" position causes the corresponding weight 60 to apply a turning moment which assists in raising the valve cap 52 off its seat and in holding the valve cap in the full open position. It is understood, of course, that, under static conditions, with no air flow or no pressure differential, each of the valve caps and the mounting means associated therewith, like the valve body 14 previously described, is of sufficient weight to overcome the moment of the displaced weight 60 connected thereto and to cause the valve cap normally to move to and remain in closed position. Hence, as the flow of air into the valve casing and tank reduces the pressure differential between the inside of the casing and the surrounding atmosphere to a predetermined value, the valve caps overcome the weights 60 and return to closed positions against the valve seats of the flanges 54. Upon such gravity initiation of closing movement of the valve caps the moment arms of the weights 60 are reduced, and continue to reduce progressively substantially to zero in the closed position of the valve. Thus, with the valve caps in closed positions, the weights 60 have substantially no turning moments about the pivot shafts 58.

In adjusting the movable valve bodies or caps as by the screw 20 and the nut 24 or the nuts 65 and the washers 63 it is possible to so connect the bell crank levers that the weights 26 and 60, upon return of the valve bodies or caps to closed positions, move beyond "dead center" positions and thereby augment the weight of the corresponding valve body or valve cap in maintaining the latter in sealing relation against the valve seat.

From the above description of my improved valve and the functioning and adjustment of its several parts it is apparent that, although of simple construction, the valve provides automatic regulation of the flow of gases into and out of the tank such that a predetermined pressure differential is maintained precluding bursting and collapsing. The valve is operative normally to seal off a tank to which it is attached so as substantially to confine the fluid therein except when predetermined pressure differentials are exceeded thus minimizing both evaporative loss and contamination of liquid stored in the tank, such as might result from flow of atmospheric air into and out of the tank. The release of noxious or objectionable odors from the tank into the atmosphere of the community in which the tank is located is also minimized.

The structure of the present valve provides separate valve bodies regulating the flow of gases into and out of the casing and separate mounting or supporting means for the respective valve bodies or caps. Yet the valve body 14 and its associated supporting or mounting means do not interfere with the flow of gas into the casing and stem 5 through the inlet passages 51. Conversely the inlet valve caps 52 and their associated mounts, by reason of their location laterally of the path of gases from the stem 5 to the outlet opening 10, do not interfere with the venting of gases from the tank to which the valve is attached. The particular arrangement described, in combination with the elongated and tapered passages, provide for relatively high rates of flow of gases in both venting gas from and admitting gas into the tank controlled by the valve.

The flow of fluids such as gases through various devices such as vent valves is customarily compared to the flow of such fluids through so called standard test nipples under the same conditions. Standard nipples are short lengths of tubular pipes of circular cross section. Valves of the type referred to herein are frequently attached to gasoline storage tanks and the like as by mounting them on one end of a standard nipple, the other end of such nipple being screwed into the opening in the tank.

The users of vent valves seek such devices having high flow rates, approaching as near as possible to the flow rates of standard nipples of corresponding sizes. The valve of the present invention provides flow rates which are entirely satisfactory and in many instances exceed the flow rates of corresponding standard nipples. By way of example, a valve such as that illustrated in the drawings and described above having internally threaded base 6 of proper size to be received on the upper end of a 2" inside diameter standard test nipple 12" long (such as may be represented by the end of the pipe 7) was found to pass about 5558 cubic feet per hour of gas, the test nipple being fastened in the opening of a tank containing gas under pressure, the pressure differential being two ounces between the interior of the tank and the atmosphere into which the exhausting gas was vented. The same standard test nipple of 2" inside diameter and 12" length, when freely vented to the atmosphere with the vent valve removed, was found to release about 4343 cubic feet per hour of gas, the test nipple being fastened to the same tank having the same two ounce pressure differential over the atmosphere. Thus the present valve design increased the flow rate through the standard test nipple from about 4343 cubic feet per hour to about 5558 cubic feet per hour. Similarly, when operating the valve on a test nipple fastened to a tank in which the pressure was below that of the surrounding atmosphere, it was found that a material increase in the rate of flow of gas or air into the tank was obtained.

The vent valve tested in the manner described had a minimum passage diameter at the lower end of the stem 5 of approximately 2½", while the diameter at the top across the outlet opening 10 was approximately 3". The distance between the plane of the valve seat on the flange 11 and the upper end of the test nipple 7 screwed into the base 6 was approximately 6½". The taper thus provided through the stem 5 and the body of the casing A is believed to materially improve the flow rate of such a valve when exhausting or venting gas from a tank or container to which it is attached and when admitting gas thereto.

The tubular exhaust extensions 50 of the valve tested and referred to were each approximately 2½" in length axially through their tapered passages. At their small diameter ends, against which seated the valve bodies 52, the tubular extensions were approximately 1¾" in diameter, while at their large diameter ends they were approximately 2⅜" in diameter.

In accordance with the present statutes the principles of the present invention may be utilized in various ways, numerous modifications and alterations being contemplated, substitution of parts and changes in construction being resorted to as desired, it being understood that the embodiment shown in the drawings and described above is given merely for purposes of explanation and illustration without intending to limit the scope of the claims to the specific details disclosed.

What I claim and desire to secure by letters patent of the United States is:

1. In a hollow casing valve, a valve opening and a valve body for sealing the opening, mounting means for the valve body comprising a lever arm in connection with the valve body and supported by the casing for pivotal movement, said lever arm supporting the valve body for movement over an arcuate path in sealing and unsealing the opening, a weight, a lever arm having connection with the weight and supported by the casing for pivotal movement between a position in which the moment arm of the weight about the pivot axis of the arm supporting the same is relatively long and a substantially dead center position, and means connecting the lever arms for movement of the valve body and weight in unison and so that the valve body is in sealing relation across the opening when the weight is in the dead center position and so that the valve body is displaced from sealing position when the weight is in long moment arm position.

2. In a hollow casing valve having a valve opening and a valve body for sealing the opening, mounting means for the valve body comprising a two armed bell crank lever, pivot means carried by the casing for supporting the lever with one arm movable between a substantially vertical position above the pivot axis of the lever and a position displaced from said vertical position, a weight on the one arm and supported thereby substantially at dead center when the one arm is in said vertical position, and means connecting the valve body to the other arm of the lever, the connected valve body being sealingly disposed across the opening when the weight is at dead center.

3. A valve for equalizing the gas pressure in a tank with the pressure of the surrounding atmosphere comprising a hollow metal casing having a tubular attaching portion on the bottom providing a passage for the flow of gas substantially vertically into and out of the hollow interior of the casing, an opening in the top of the casing substantially vertically aligned with the passage, a valve body for sealing the opening, means on the outside of the casing mounting the valve body for pivotal movement toward and away from the opening, a hood disposed across the top of the casing in spaced relation thereto, the hood enclosing the valve body and the mounting means, said hood also including a depending portion extending downwardly below the level of the top opening and in spaced relation to the casing to provide a passage into the space between the casing and the hood having a downwardly directed opening, and means securing the hood to the casing for facile removal.

4. A valve for equalizing the gas pressure in a tank with the pressure of the surrounding atmosphere comprising a hollow metal casing having a tubular attaching portion on the bottom providing a passage for the flow of gas substantially vertically into and out of the hollow interior of the casing, an opening in the top of the casing substantially vertically aligned with the passage, a valve body for sealing the opening, means on the outside of the casing mounting the valve body for pivotal movement toward and away from the opening, said casing also having a hollow wing portion providing an internal recess communicating with said passage, an opening into said recess through the wing portion of the casing, a closure for sealing the last mentioned opening, a hood disposed across the top of the casing in spaced relation thereto, the hood enclosing the valve body and the mounting means, said hood also including a depending portion extending downwardly below the level of the top opening and in spaced relation to the casing to provide a passage into the space between the casing and the hood having a downwardly directed opening, and means securing the hood to the casing for facile removal.

5. A valve for equalizing the gas pressure in a tank with the pressure of the surrounding atmosphere comprising a hollow metal casing having a tubular attaching portion on the bottom providing a passage for the flow of gas substantially vertically into and out of the hollow interior of the casing, an opening in the top of the casing substantially vertically aligned with the passage, a valve body for sealing the opening, means on the outside of the casing mounting the valve body for pivotal movement toward and away from the opening, said casing also having a hollow wing portion providing an internal recess communicating with said passage, an opening into said recess through the wing portion of the casing, a closure for sealing the last mentioned opening, a hood disposed across the top of the casing in spaced relation thereto, the hood enclosing the valve body and the mounting means, said hood also including depending portions extending downwardly below the level of the top opening and on opposite sides of the wing portion, the depending portions being in spaced relation to the casing to provide passages into the space between the casing and the hood, and means securing the hood to the casing for facile removal.

6. A vent valve for use on a storage tank or the like comprising a hollow casing having an internal chamber and valve seat means defining an opening into the chamber, a valve body engageable with the valve seat means to seal the opening, lever means for mounting the valve body for movement toward and away from the seat means, said lever means comprising a pair of angularly disposed arms, a weight connected to one of the arms, means connecting the valve body to the other of the arms, and means mounting the lever means on the casing for pivotal movement about an axis substantially through the juncture of the arms, said one lever arm extending upwardly from the pivot axis and the angle between the arms being such that when the valve body is disposed sealingly against the valve seat means the center of gravity of the weight and the one arm is disposed substantially vertically above the pivot axis in a dead center position.

7. A vent valve for use on a storage tank or the like comprising a hollow casing having an internal chamber and valve seat means defining an opening into the chamber, a valve body engageable with the valve seat means to seal the opening, means mounting the valve body for movement toward and away from the valve seat means, said mounting means comprising a pair of interconnected lever arms and means supporting the lever arms on the casing for pivotal movement in unison about a common axis, a weight connected to one of the arms, and means connecting the valve body to the other of the arms for universal tilting in settling against the valve seat means, said one lever arm extending upwardly from the pivot axis, and the weight being supported by such one lever arm above the pivot axis, and the connection between the lever arms being such that when the valve body is disposed sealingly against the valve seat means the center of gravity of the weight and the one arm is disposed substantially vertically above the pivot axis in a dead center position.

8. A vent valve for use on a storage tank or the like comprising a hollow casing having an internal chamber and valve seat means defining an opening into the chamber, a valve body engageable with the valve seat means to seal the opening, means mounting the valve body for movement toward and away from the valve seat means, a lever arm, means supporting the lever arm on the casing for pivotal movement about a substantially horizontal axis, a weight on the lever arm and disposed above the pivot axis, and means connecting the valve body to the lever arm for simultaneous movement, the connection between the lever arm and the valve body including a universal pivot permitting settling of the valve body against the valve seat means and being such that when the valve body is disposed sealingly against the valve seat means the center of gravity of the weight and the lever arm is disposed substantially vertically above the pivot axis in a dead center position.

9. A vent valve for use on a storage tank or the like comprising a hollow casing having an internal chamber and valve seat means defining a substantially horizontal opening into the chamber, a valve body engageable with the valve seat means to seal the opening, a lever arm, means supporting the lever arm on the casing for pivotal movement about a substantially horizontal axis, a weight on the lever arm and disposed above the pivot axis, and means connecting the valve body to the lever arm for simultaneous movement, the connection between the lever arm and the valve body including a universal pivot permitting settling of the valve body against the valve seat and being such that when the valve body is disposed sealingly against the valve seat means the center of gravity of the weight and the lever arm is disposed substantially vertically above the pivot axis in a dead center position, and when the valve body is raised from the valve seat means in unsealing the opening the weight is displaced from the dead center position and exerts a gravitational force on the lever arm producing a turning moment about the pivot axis which moment produces a lifting force on the valve body through said connection.

10. In a valve for venting storage tanks and the like a casing having a generally horizontal opening, a movable valve body normally resting by gravity on the casing and disposed across the opening for sealing the opening, a weight, pivot means carried by the casing, and means mounting the valve body and the weight on the pivot means in interconnected relation for pivotal swinging movement in unison, said mounting means supporting the valve body for arcuate swinging movement upwardly and away from the horizontal casing opening and including lever means connected to the valve body to suspend the latter for universal tilting movement relative to the casing, said mounting means also including lever means normally supporting the weight in dead center position above the pivot means when the valve body is in sealing position across the opening, the mounting means being arranged upon displacement of the valve body from said sealing position across the opening to swing the weight over an arcuate path and away from dead center, whereby during the upward movement of the valve body away from the opening the turning moment of the weight about the pivot means progressively increases to augment the lifting force on the valve body.

References Cited in the file of this patent

UNITED STATES PATENTS

| Number | Name | Date |
|---|---|---|
| 74,244 | Porter | Feb. 11, 1868 |
| 635,104 | Lunken | Oct. 17, 1899 |
| 894,897 | Osborne | Aug. 4, 1908 |
| 1,094,543 | Donelly | Apr. 28, 1914 |
| 1,309,008 | Ascher | July 8, 1919 |
| 1,327,693 | Bewan | Jan. 13, 1920 |
| 1,367,911 | Koplin | Feb. 8, 1921 |
| 1,620,720 | Buck | Mar. 15, 1927 |
| 1,918,337 | Jones | July 18, 1933 |
| 1,941,695 | Kilgour | Jan. 2, 1934 |
| 2,048,088 | Wagner | July 21, 1936 |
| 2,116,769 | Schroeder | May 10, 1938 |
| 2,415,466 | Curtis | Feb. 11, 1947 |
| 2,461,351 | Silverman | Feb. 8, 1949 |
| 2,517,194 | Garretson | Aug. 1, 1950 |

FOREIGN PATENTS

| Number | Country | Date |
|---|---|---|
| 6,832 | Great Britain | 1899 |
| 545,142 | Germany | 1932 |